United States Patent
Chmielewski et al.

(10) Patent No.: US 8,326,258 B2
(45) Date of Patent: Dec. 4, 2012

(54) OVERRIDING VEHICLE COMMUNICATIONS IN EMERGENCY SITUATIONS

(75) Inventors: Laura R. Chmielewski, Huntington Woods, MI (US); Daniel C. McGarry, Oxford, MI (US)

(73) Assignee: General Motors LLC, Detroit, MI (US)

( * ) Notice: Subject to any disclaimer, the term of this patent is extended or adjusted under 35 U.S.C. 154(b) by 0 days.

(21) Appl. No.: 12/846,105

(22) Filed: Jul. 29, 2010

(65) Prior Publication Data
US 2012/0028597 A1    Feb. 2, 2012

(51) Int. Cl.
*H04W 4/12* (2009.01)
*H04W 4/22* (2009.01)

(52) U.S. Cl. ............... 455/404.1; 455/569.2; 455/575.9; 455/556.1; 340/426.13; 340/426.16; 340/426.2; 340/539.16; 340/539.18; 379/40; 379/45; 379/218.02

(58) Field of Classification Search .... 455/404.1–404.2, 455/521, 414.1–415, 344–346, 567–569.2, 455/575.9, 556.1; 340/429, 426.11–426.36, 340/438, 436, 461, 539.1–539.2, 10.2–10.32; 379/37, 40, 45, 51, 142.1, 201.01, 203.01, 379/218.02, 265.01, 260–267, 308, 321, 379/448

See application file for complete search history.

(56) References Cited

U.S. PATENT DOCUMENTS

| | | | | |
|---|---|---|---|---|
| 6,973,333 | B1* | 12/2005 | O'Neil | 455/569.2 |
| 2004/0142678 | A1* | 7/2004 | Krasner | 455/404.2 |
| 2006/0122774 | A1* | 6/2006 | Nou | 701/213 |
| 2006/0160575 | A1* | 7/2006 | Laghrari | 455/563 |
| 2008/0205619 | A1* | 8/2008 | Kaiaboukis et al. | 379/215.01 |

* cited by examiner

*Primary Examiner* — Ajit Patel
*Assistant Examiner* — Erica Navar
(74) *Attorney, Agent, or Firm* — Anthony Luke Simon; Reising Ethington P.C.

(57) ABSTRACT

A system and method for controlling calls in a vehicle during an emergency situation that includes identifying an emergency situation and placing a voice call or a data call to the vehicle in response to the emergency situation. If the placed call cannot be connected because the vehicle has another call in progress, then an SMS message is sent to the vehicle which contains a command used by the vehicle to interrupt the in-progress call. This enables a call center or public safety personnel to obtain remote access in emergency situations, such as when the vehicle location needs to be determined or an occupant of the vehicle is contacted.

20 Claims, 2 Drawing Sheets

OVERRIDING VEHICLE COMMUNICATIONS IN EMERGENCY SITUATIONS

TECHNICAL FIELD

The present invention relates generally to wireless communications and more particularly to wireless vehicle telecommunications during an emergency situation.

BACKGROUND OF THE INVENTION

Increasingly, vehicle manufacturers outfit their vehicles with a wide array of wireless communications capabilities. Telematics units installed in modern vehicles can wirelessly send both voice and data communications to a variety of recipients. Recipients can be central facilities that include servers and/or live advisors capable of responding to the telematics unit. Recipients can also include external callers. Vehicles equipped with telematics units have the ability to provide a diverse array of emergency and non-emergency telematics services. In some instances, the vehicle telematics unit might be involved in a phone call during an emergency situation that prevents the central facility or a public safety access point from communicating with the vehicle. This makes telecommunications access to the vehicle during the in-progress call difficult if not impossible.

SUMMARY OF THE INVENTION

According to an aspect of the invention, there is provided a method of controlling calls in a vehicle during an emergency situation. The steps include identifying an emergency situation; placing a voice call or a data call to the vehicle in response to the emergency situation; if unable to connect the placed call with the vehicle, determining whether the vehicle has another call in progress that is preventing the placed call from connecting with the vehicle; and if so, sending an SMS message to the vehicle based on the identified emergency situation, wherein the SMS message contains a command instructing the vehicle to interrupt the other call.

According to another aspect of the invention, there is provided a method of controlling calls in a vehicle during an emergency situation. The steps include identifying an emergency situation; placing a voice call or a data call to the vehicle; determining that the vehicle is connected to an external caller via an in-progress voice call or data call; initiating a call interrupt function from a call; sending a message to the vehicle based on the call interrupt function that instructs the vehicle to end the in-progress call and place an outbound call from the vehicle.

According to yet another aspect of the invention, there is provided a method of controlling calls in a vehicle during an emergency situation. The steps include identifying an emergency situation; placing a voice call or a data call to the vehicle; determining that a telematics device of the vehicle is connected to an external caller via a voice call or data call; initiating a call interrupt function from a call center that ends the voice call or the data call between the telematics device and the external caller; transmitting an SMS message to the vehicle based on the initiated call interrupt function; disconnecting the voice call or data call based on an instruction included in the SMS message; preventing the establishment of external voice calls or external data calls to or from the telematics device based on an instruction included in the SMS message; and placing a voice call or data call to the telematics device from the call center, wherein the voice call or data call includes information based on the identified emergency situation.

BRIEF DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION OF THE PREFERRED EMBODIMENT(S)

The method described below involves interrupting unwanted vehicle communications during an emergency. Many situations can be considered an emergency. One of those situations includes the theft of a vehicle. In that case, a thief may have access to the communication capabilities of the vehicle. And while the thief operates that vehicle, he or she may place/receive voice and/or data calls from/at the vehicle. This may be undesirable for a number of reasons. For instance, the vehicle communication functionality may help the thief commit further crimes. Or it may prevent law enforcement or a call center from communicating with the vehicle to stop, slow, or otherwise control its operation. Another emergency situation sometimes encountered involves the need to urgently contact the driver or other occupant whether for a medical emergency or other reason. This can be problematic where the vehicle is currently involved in an in-progress call, such as a hands-free voice call involving the driver or a data call being used to provide telematics services. Using the methods and system disclosed herein, emergency telecommunications access to the vehicle can be obtained by sending instructions to the vehicle over a data communication channel selectively ending at least some of the communications to/from the vehicle. These instructions can also direct the vehicle to take some action(s) as a result of ending communications, such as contacting a call center.

Figure 1:
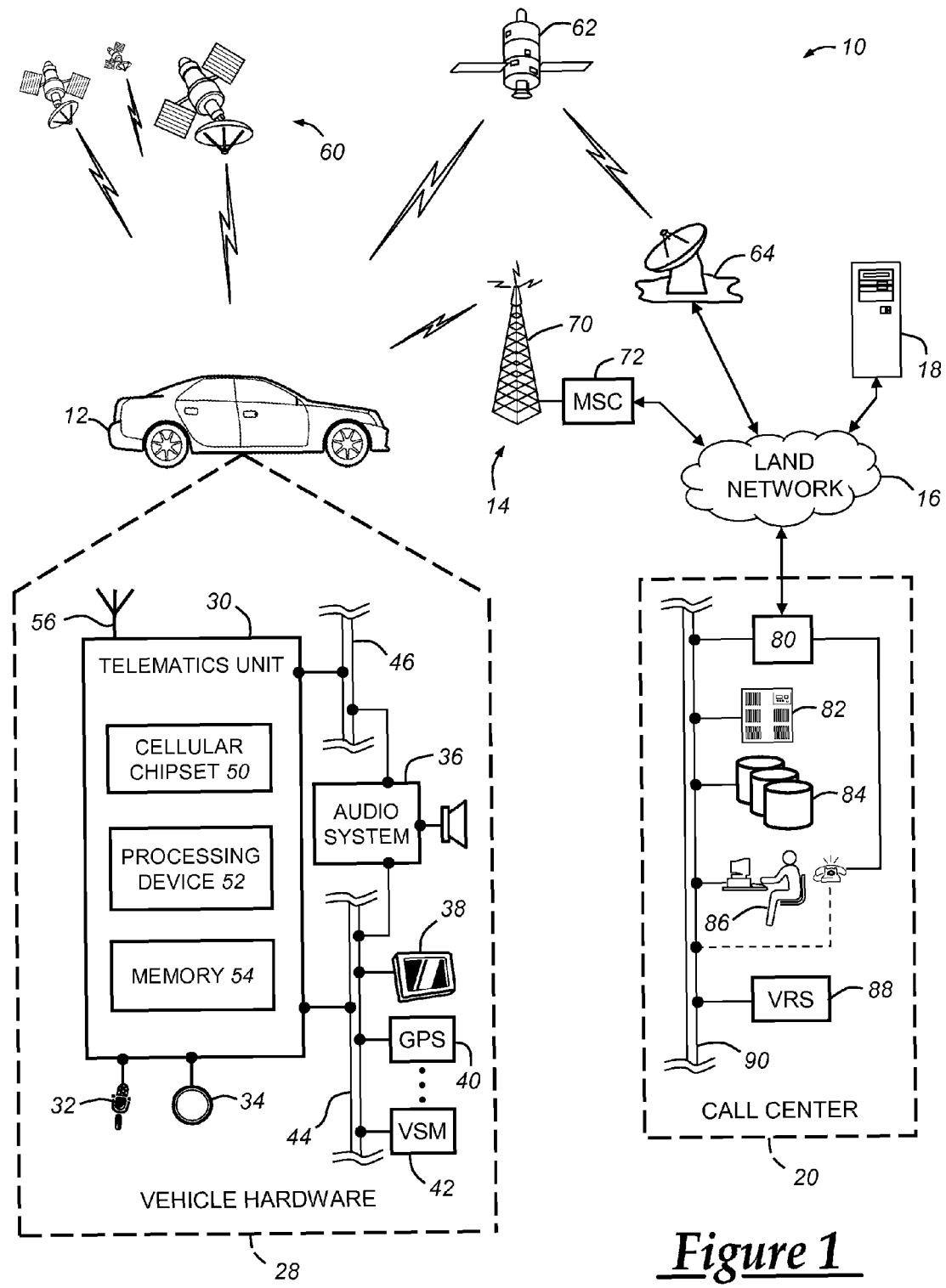
FIG. 1 is a block diagram depicting an exemplary embodiment of a communications system that is capable of utilizing the method disclosed herein.

With reference to FIG. 1, there is shown an exemplary operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 is an OEM-installed device that enables wireless voice and/or data communication over wireless carrier system 14 and via wireless networking so that the vehicle can communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Figure 2:
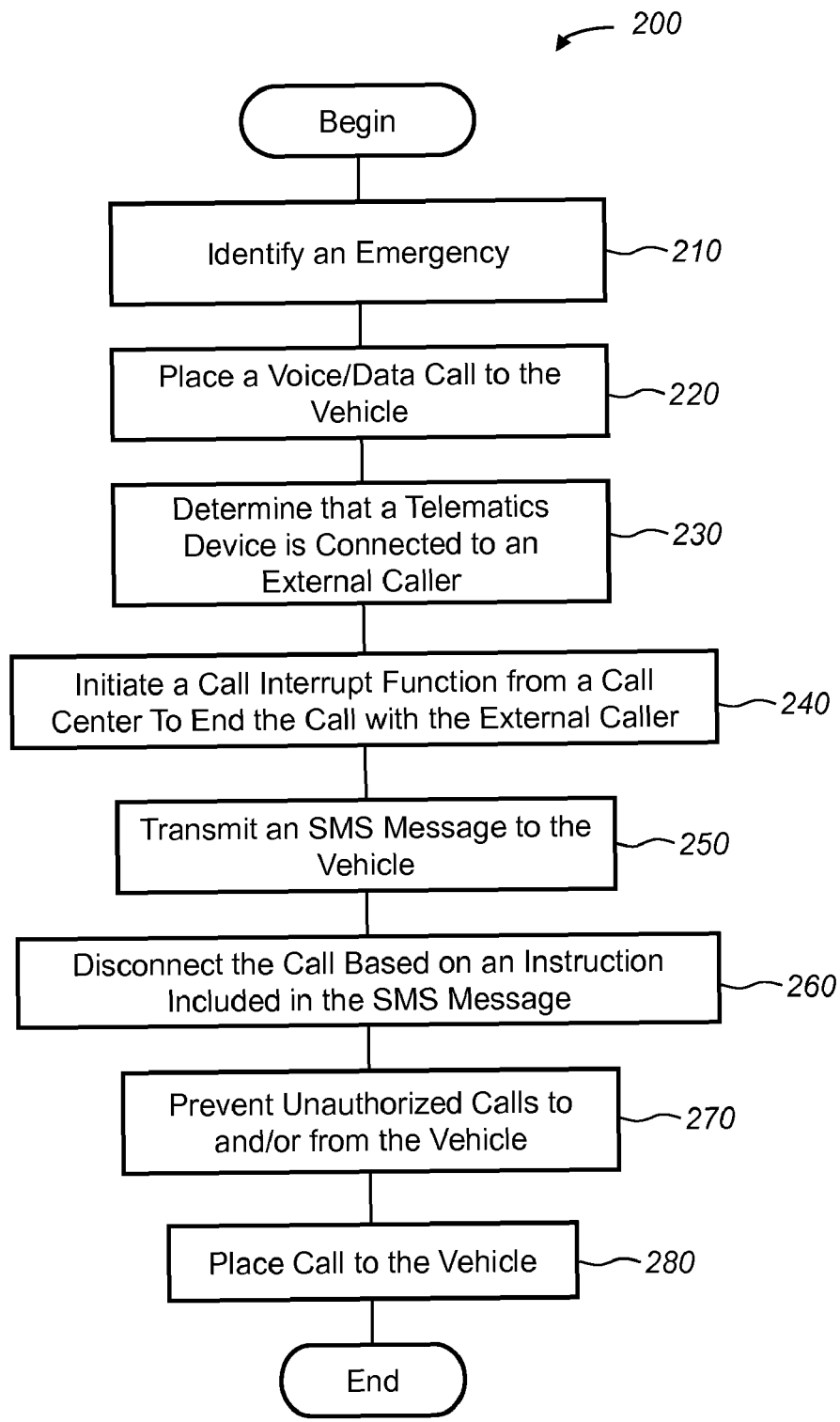
FIG. 2 is a flow chart depicting an exemplary embodiment of the method disclosed herein.

Turning now to FIG. 2, there is a flow chart depicting an exemplary embodiment of a method 200 for overriding vehicle communications in emergency situations. The method 200 begins at step 210 by identifying an emergency situation. Several types of emergency situations can be identified. Those situation types include the theft of the vehicle 12, the issuance of a child abduction alert (e.g. Amber Alert), a family medical emergency, a missing person search, or any other circumstance under which urgent telecommunication access to the vehicle is needed or desired. And identifying an emergency situation can depend the type of emergency. For example, the theft of a vehicle 12 can be reported by a vehicle owner who determines that the vehicle 12 is missing. The vehicle owner can contact a Public Safety Access Point (PSAP) who, in response, can contact the call center 20 in communication with the vehicle 12. The theft of the vehicle can also involve receiving input at the telematics unit 30 from one or more sensors or VSMs 42 that indicates the vehicle 12 is moving without the owner's consent. In that case, the telematics unit 30 can alert the call center 20 before the vehicle thief uses the vehicle's communication functionality.

At step 220, a voice call or a data call to the vehicle is placed. The call can attempt to contact the thief, such as to inform him that the vehicle 12 is being monitored. Alternatively, or additionally, the call can be exploratory in nature; made in an attempt to confirm the emergency identified in step 210. If the attempted call is a voice call, it can be placed over the voice channel of the wireless carrier system 14 and attempt to communicate in a bi-directional manner with the thief or any other vehicle occupant. If the attempted call is a data call, it can be placed over a data channel (or the voice channel) of the wireless carrier system 14. The call can be used to attempt to communicate with the thief or other vehicle occupant through any one or more of the speakers of the audio system 36 (e.g. using speech recognition capabilities or pre-recorded speech), the visual display 38, or push button(s) 34 located in the vehicle 12. In the present example, the call(s) are attempted by the call center 20, but it should be appreciated that in other implementations the attempted call can originate from other third party locations.

At step 230, it is determined whether the telematics unit of the vehicle is connected to an external caller via a voice call or data call. This can involve an unsuccessful attempt to place the voice call or the data call. In one example, the call center 20 attempts to contact the vehicle 12 using a voice call and receives in return a busy signal. Given that the vehicle 12 returned a busy signal, the call center 20 might determine from this that the driver is using the vehicle communications functionality. In another example, a data call can be placed from the call center 20 that instructs the telematics unit 30 to send a data message in response indicating if the vehicle communications functionality of the vehicle 12 is presently in use. The call center 20 can receive that message from the vehicle 12 and determine that the vehicle 12 is connected to an external caller.

At step 240, a call interrupt function is initiated from a call center that ends the voice call or the data call between the telematics device and the external caller. After identifying an emergency situation and determining that the telematics unit 30 is connected to an external caller, the advisor 86 at a call center 20 can decide to terminate present and/or future communications at the vehicle 12. In this example, the advisor 86 can be a particular type of advisor at the call center; one that has access to a direct communications channel with the PSAP or one with specific authority to interrupt the functions of a vehicle 12. The call interrupt function can involve constructing a message for the vehicle 12 that includes a command to interrupt (barge in or end) the in-progress call. The message can be an SMS message or other such message capable of communicating data. For instance, the contents of the message can include one or more commands that instruct the telematics unit to carry out one or more actions, such as: terminating present communications to and from the vehicle 12, initiating a call to the call center 20 after terminating communications, or displaying or otherwise presenting a message inside the vehicle 12.

At step 250, the SMS message is transmitted to the vehicle based on the initiated call interrupt function. The SMS message includes one or more instructions interpreted and carried out by the vehicle 12. The instructions, as mentioned above, can include terminating present communications to and from the vehicle 12, generating a call to the call center 20 after terminating communications, or displaying a message inside the vehicle 12. Here, the instructions can be inserted into the SMS message and sent to the vehicle 12. The SMS message can be a machine-to-machine communication originating at the call center 20. Machine-to-machine communications can be received, interpreted, and acted on by a variety of software and/or hardware modules resident on the vehicle 12. For example, the SMS message can be received by the telematics unit 30 via the dual antenna 56 and interpreted with the electronic processing device 52. In these examples, the SMS message can be task specific; directing the telematics unit 30 to—at a minimum—end the present communications to or from the vehicle 12. In another example, as part of the call interrupt initiation in step 240, the call center 20 can direct a third party to send SMS message to the vehicle 12.

At step 260, the voice call or data call is disconnected based on an instruction included in the SMS message. After the SMS message is received and interpreted, the voice or data call presently in progress is ended. For example, the processing device 52 of the telematics unit 30 can also execute the received instructions via the software and/or hardware previously described. If desired, it is also possible to send a message from the telematics unit 30 to the speakers 36 or the display 38 that informs the thief or vehicle occupant of the disconnection process.

At step 270, the establishment of additional voice or data calls to or from the telematics device is prevented based on a command included with the SMS message. This can include ignoring (e.g., not answering) calls received by the vehicle unless they are from the call center or other authorized party, and this can be done using means known to those skilled in the art, such as by using caller ID to distinguish between incoming calls. As with disconnecting the call, the processing device 52 of the telematics unit 30 can also execute the received command via previously-stored onboard software of the telematics unit 30. In one example of this step, the telematics unit 30 can deactivate some or all of its in-vehicle inputs to prevent them from initiating new calls from the vehicle. While the thief or vehicle occupant is unable to receive or initiate voice and/or data calls, that is not to say that the cellular chipset 50 and/or data connection has been deactivated. Rather, the telematics unit 30 will remain ready to communicate with the call center 20, the PSAP, or some other entity involved with the emergency regardless of whether the communications involve data or voice.

At step 280, a voice call or data call is placed to the telematics unit from the call center. Once the previously-placed voice call or data call is disconnected, the call center 20 can then contact the vehicle 12 via voice call or data call. Even though the telematics unit 30 can prevent the placement/receipt of calls to/from the vehicle 12, the unit 30 can maintain an exception for calls originating from specific callers, such as the call center 20, the PSAP, or another specific caller. In that way, the telematics unit 30 can prevent unwanted calls while simultaneously allowing calls from the specific caller. The calls originating from specific callers can be identified by the telematics unit 30 using an identifying feature included with the call and data previously-stored at the vehicle 12. For example, the identifying feature included in the call from the specific caller can include Automatic Numbering Information (ANI) and the telematics unit 30 can selectively answer calls originating from specific callers by comparing the ANI information included with the call with ANI information previously-stored in the telematics unit 30. It is also possible that the call from the specific caller can include caller ID information, which can be recognized by the telematics unit and compared against caller ID information stored at the vehicle 12. Of course, it should be appreciated that other embodiments are possible in which it is not necessary to maintain information about specific callers at the vehicle 12. In that case, step 270 can be omitted and the specific caller simply attempts to call the vehicle 12 as described in this step without blocking calls to/from the vehicle 12. That is, if the call center 20 is unable to contact the vehicle 12, the method 200 returns to step 240.

The voice call or data call includes information based on the identified emergency situation. That information can be used to provide a range of vehicle services, such as determining vehicle location, interrupting the operation of the powertrain of the vehicle, and or receiving data relating to vehicle operation. For instance, the vehicle 12 can receive a call from the call center 20 via the telematics unit 30 that includes an instruction for slowing down or stopping the vehicle 12. That call can also instruct the telematics unit 30 to monitor and periodically report the location of the vehicle 12 to the call center 20 or PSAP. Additionally, or alternatively, the call can include an instruction that controls the powertrain of the vehicle 12 via the telematics unit 30. In that case, the telematics unit 30 can communicate with a VSM 42, such as the engine control module or powertrain control module, over the vehicle bus 44 and command the VSM 42 to slowly bring the vehicle 12 to a lower speed or a complete stop. Other vehicle services are possible. The method 200 then ends.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of controlling calls in a vehicle during an emergency situation, comprising the steps of:
   (a) identifying an emergency situation;
   (b) placing a voice call or a data call to the vehicle in response to the emergency situation;
   (c) if unable to connect the placed call with the vehicle, then determining whether the vehicle has another call in progress that is preventing the placed call from connecting with the vehicle; and, if so,
   (d) sending a short message service (SMS) message to the vehicle based on the identified emergency situation, wherein the SMS message contains a command instructing the vehicle to interrupt the other call.

2. The method of claim 1, further comprising the step of receiving a call automatically placed by the vehicle to a call center.

3. The method of claim 2, further comprising the step of establishing the received call as a voice call and placing a live advisor at the call center in voice communication with an occupant of the vehicle.

4. The method of claim 1, wherein step (a) further comprises the step of detecting the theft of a vehicle using sensor input received from vehicle sensors.

5. The method of claim 1, wherein step (b) further comprises the step of placing the voice call or data call using a live advisor at a call center.

6. The method of claim 5, wherein the live advisor is in communication with a Public Safety Access Point (PSAP).

7. The method of claim 1, wherein step (c) further comprises the step of instructing the vehicle to send a data message to the call center if the vehicle is connected to an external caller.

8. The method of claim 1, further comprising the step of constructing the SMS message, wherein the constructed SMS message includes a command to carry out any one or more of the following steps: terminating present communications to and from the vehicle, initiating a call to the call center from the vehicle, or communicating a message to occupants inside of the vehicle.

9. The method of claim 1, wherein the SMS message further comprises a machine-to-machine communication.

10. A method of controlling calls in a vehicle during an emergency situation, the steps comprising the steps of:
    (a) identifying an emergency situation;
    (b) placing a voice call or a data call to the vehicle;
    (c) determining that the vehicle is connected to an external caller via an in-progress voice call or data call;
    (d) initiating a call interrupt function from a call center;
    (e) sending a message created using a text-messaging service of a wireless carrier system to the vehicle based on the call interrupt function, wherein the message includes a command that instructs the vehicle to:
       (e1) end the in-progress call; and
       (e2) place an outbound call from the vehicle.

11. The method of claim 10, wherein the sent message is an SMS message.

12. The method of claim 10, wherein step (a) further comprises the step of detecting the theft of a vehicle using sensor input received from vehicle sensors.

13. The method of claim 10, further comprising the step of receiving the outbound call at the call center and connecting the received call to a live advisor.

14. The method of claim 13, wherein the live advisor is in communication with a Public Safety Access Point (PSAP).

15. The method of claim 13, wherein step (c) further comprises the step of detecting a busy signal as a result of the placed call.

16. The method of claim 10, wherein step (c) further comprises the step of instructing the vehicle to send a data message to the call center if the vehicle is connected to an external caller.

17. The method of claim 10, further comprising the step of constructing the message, wherein the constructed message includes a command to carry out any one or more of the following steps: terminating present communications to and from the vehicle, initiating a call to the call center from the vehicle, or communicating a message to occupants inside of the vehicle.

18. The method of claim 10, wherein the message further comprises a machine-to-machine communication.

19. A method of controlling calls in a vehicle during an emergency situation, the steps comprising:
   (a) identifying an emergency situation;
   (b) placing a voice call or a data call to the vehicle;
   (c) determining that a telematics device of the vehicle is connected to an external caller via an in-progress voice call or data call;
   (d) initiating a call interrupt function from a call center;
   (e) transmitting a short message service (SMS) message to the vehicle based on the initiated call interrupt function;
   (f) disconnecting the voice call or data call based on an instruction included in the SMS message;
   (g) preventing the establishment of external voice calls or external data calls to or from the telematics device based on an instruction included in the SMS message; and
   (h) placing a voice call or data call to the telematics device from the call center, wherein the voice call or data call includes information based on the identified emergency situation.

20. A method of controlling calls in a vehicle during an emergency situation, the steps comprising:
   (a) identifying an emergency situation;
   (b) placing a voice call or a data call to the vehicle;
   (c) determining that a telematics device of the vehicle is connected to an external caller via an in-progress voice call or data call;
   (d) initiating a call interrupt function from a call center;
   (e) constructing a short message service (SMS) message, wherein the constructed SMS message includes a command to carry out any one or more of the following steps:
   terminating present communications to and from the vehicle, initiating a call to the call center from the vehicle, or communicating a message to occupants inside of the vehicle;
   (f) transmitting the SMS message to the vehicle based on the initiated call interrupt function;
   (g) disconnecting the voice call or data call based on an instruction included in the SMS message;
   (h) preventing the establishment of external voice calls or external data calls to or from the telematics device based on an instruction included in the SMS message; and
   (i) placing a voice call or data call to the telematics device from the call center, wherein the voice call or data call includes information based on the identified emergency situation.

* * * * *